Nov. 16, 1926.  E. D. TILLYER  1,607,580
LENS
Filed August 7, 1924
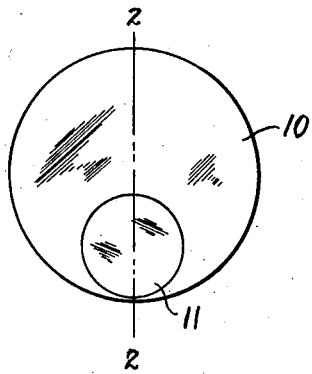
Fig.1
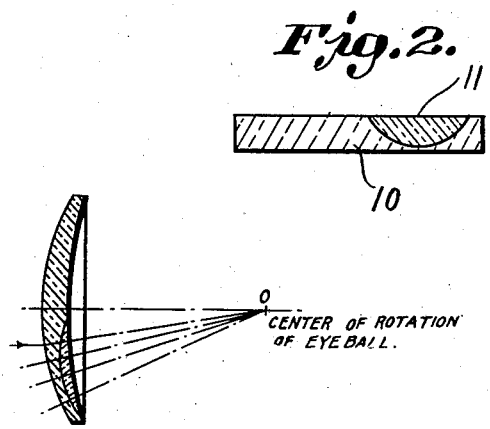
Fig.2.
Fig.7.
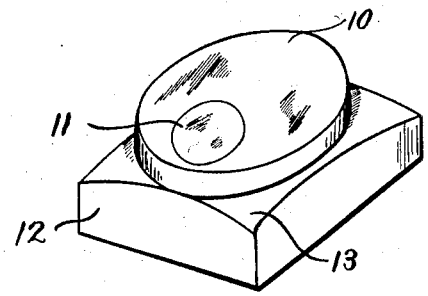
Fig.3
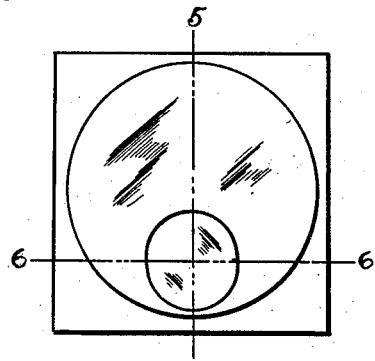
Fig.4
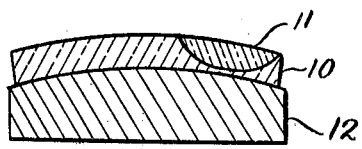
Fig.5
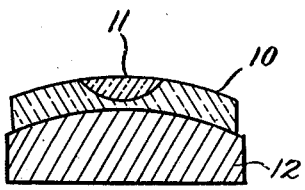
Fig.6
INVENTOR
EDGAR D. TILLYER.
BY
Harry H. Styll.
ATTORNEY Patented Nov. 16, 1926.

1,607,580

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

Application filed August 7, 1924. Serial No. 730,565.

The present invention relates to a new and useful multifocal lens and to a process for forming two part lenses which are well known in the art as fused or Kryptok lenses. It is a well known fact that in a finished lens of this type the oblique vision through the reading portion is variable, increasing in power from the center towards the margin, which is quite a pronounced and objectionable aberration.

An important object of the invention is to provide an improved multifocal lens formed of two pieces of glass of different indices of refraction which will be practically free from the objectionable variations present in the reading portion of the prior art lenses of this type.

Another very important object of the invention is to provide a new and improved process for forming two part lenses whereby the objectionable oblique errors will be eliminated so as to produce a reasonably correct vision or visions through the reading portion of the lens.

Another very important object of the invention is to provide a multifocal lens and process for forming the same wherein the finished lens will have a substantially elliptical shaped button and in which the button will be composed of two major meridians, the curvatures of which will be different to compensate for the oblique errors.

Other advantages and objects of the invention will become apparent during the course of the following description.

In the drawings, wherein like numerals are employed to designate like parts throughout the same:

Figure 1 is a top plan view of a lens blank similar to the prior art structures.

Figure 2 is a section taken on line 2—2 in Figure 1.

Figure 3 is a perspective view showing a blank as illustrated in Figure 1 after the first step of my improved process.

Figure 4 is a top plan view of a blank after it has been formed in accordance with the present invention.

Figure 5 is a section taken on line 5—5 of Figure 4.

Figure 6 is a section taken on line 6—6 in Figure 4.

Figure 7 is a diagrammatic view of a cross section of a bifocal lens showing oblique vision through the reading portion.

It will be noted from the diagrammatic view, Figure 7, that the reading portion or segment of a bifocal lens being placed at the bottom of the lens below the center of the eye and below the optical axis of the distance portion, practically all the rays of light from the center of the eye will pass obliquely through the reading portion. In other words, a bifocal lens located in its position of greatest use before the eye is practically always looked thru in an oblique direction, and it is well known that oblique vision is not as clear as vision along the optical axis or vision that goes normally thru the lens. For this reason, among others, it has been found that there is considerable variation in the power at the center of the segment or reading portion of a fused bifocal from that of the marginal portions, as much as a half diopter variation being noted in some of the ordinary numbers of these lenses.

Therefore, one of the main objects of this invention is to neutralize this variation of power in the various portions of the reading portion of the bifocal. It will be obvious that, as shown, the greater error will probably fall in the vertical plane when the lens is in position before the eye, but there may be variations in the horizontal or other planes and it is a part of the conception of this invention that these variations in the horizontal, vertical or any other plane may be made by providing the necessary means for neutralizing the error at any given angle or angles.

In the drawings wherein for the purpose of illustration is shown a preferred embodiment of the invention, the numeral 10 designates a multifocal lens blank which is provided with the insert or button 11.

Heretofore, the recesses in which the button 11 is fused have been spherical in curvature. The spherical recesses have been objectionable due to the fact that the vision thru the button increased in power from the centre toward the edge thereof so that the true vision has not been obtained when looking through the button near the marginal edge.

In accordance with the present invention, the recess having a spherical curve is formed in the blank and the button 11 is fused therein. After this operation, the blank as illustrated in Figures 1 and 2, is placed upon the block 12 which has a toric surface formed thereon, i. e., a surface having different curvatures in the two major meridians. In other words, the major meridians of the block 12 which are at right angles to each other have different curvatures. The blank is then placed on the block 12 and sufficient heat is applied to the parts to permit the lens blank to settle down so as to assume the surface shape 13 of the block 12. As is shown in Figure 3, the button 11 will assume an eliptical shape as is shown in Fig. 4.

The action of the lens blank upon the block is clearly shown in Figures 5 and 6, in that it is shown with a toric button which is really formed because of the fact that the glass is so bent over the block under the action of heat that the button is bent or distorted into an elliptical shape having a minor and a major meridian of different curvatures. It will be seen from the foregoing that the spherical countersink has been bent to a toric surface shape.

A slight modification includes heating the button and blank together to fuse the button into the recess, after which the heat is increased so as to let the blank drop to a toric shape, thus bending the button as in the first instance, but in one continuous operation.

It is to be understood that the button will not necessarily have to assume the elliptical shape positioned as shown in Figure 4 because the meridians can be shifted to any required angular position to neutralize the oblique errors to desired requirements.

It will, therefore, be seen from the foregoing that I have provided a lens and process for forming the same whereby the amount of oblique errors present in the button or reading portion has been reduced to a minimum, and neutralized as desired.

It is to be understood that the form of the invention herewith shown and described is to be taken as the preferred embodiment of the same and that various changes in the size, shape and arrangement of parts may be resorted to without departing from the spirit of the invention or the scope of the subjoined claims.

Having thus described my invention, I claim:

1. A blank for making a multifocal lens comprising a major blank of one index of refraction having a finished lens seat on one side thereof, a minor blank of a different index of refraction having a finished surface secured to the lens seat of the first blank and a bend throughout the body of the major blank of a curvature in one meridian of a magnitude to neutralize the inherent astigmatism of the minor portion of the finished lens.

2. A blank for making a multifocal lens comprising a major blank of one index of refraction having a finished spherical lens seat on one side thereof, a minor blank of a different index of refraction having a finished surface secured to the curved lens seat of the first blank and a bend throughout the major blank of a curvature in one meridian of a magnitude to neutralize the inherent astigmatism of the minor portion of the finished lens.

EDGAR D. TILLYER.